United States Patent
Saghir et al.

(10) Patent No.: US 9,843,408 B2
(45) Date of Patent: Dec. 12, 2017

(54) CO-CHANNEL INTERFERENCE MITIGATION IN WIRELESS RADIO ACCESS NETWORK

(71) Applicant: Verizon Patent and Licensing Inc., Arlington, VA (US)

(72) Inventors: Amir Saghir, Frisco, TX (US); Jignesh S. Panchal, Somerset, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 207 days.

(21) Appl. No.: 14/820,292

(22) Filed: Aug. 6, 2015

(65) Prior Publication Data

US 2017/0041098 A1    Feb. 9, 2017

(51) Int. Cl.
| | |
|---|---|
| *H04J 11/00* | (2006.01) |
| *H04W 72/04* | (2009.01) |
| *H04W 72/12* | (2009.01) |
| *H04W 72/08* | (2009.01) |

(52) U.S. Cl.
CPC ..... *H04J 11/0053* (2013.01); *H04W 72/0426* (2013.01); *H04W 72/082* (2013.01)

(58) Field of Classification Search
CPC .. H04J 11/0053; H04J 11/005; H04J 11/0056; H04W 72/0426; H04W 72/082
See application file for complete search history.

(56) References Cited

U.S. PATENT DOCUMENTS

| | | | | |
|---|---|---|---|---|
| 2004/0117149 | A1* | 6/2004 | Engbrecht | H04L 12/2697 702/182 |
| 2011/0151920 | A1* | 6/2011 | Oh | H04W 92/20 455/525 |
| 2012/0100860 | A1* | 4/2012 | Lei | H04W 36/20 455/438 |
| 2012/0225646 | A1* | 9/2012 | Mochida | H04W 84/042 455/422.1 |
| 2012/0307697 | A1* | 12/2012 | Mukhopadhyay | H04W 4/001 370/311 |
| 2014/0126501 | A1* | 5/2014 | Pan | H04L 5/0032 370/329 |
| 2017/0064571 | A1* | 3/2017 | Kusashima | H04W 24/10 |

OTHER PUBLICATIONS

Indika, "Difference Between Encapsulation and Tunneling," May 18, 2011 http://www.differencebetween.com/difference-between-encapsulation-and-vs-tunneling/.*
"System Architecture Evolution," Mar. 29, 2017, Wikipedia, https://en.wikipedia.org/wiki/System_Architecture_Evolution.*

* cited by examiner

*Primary Examiner* — Maharishi Khirodhar
*Assistant Examiner* — Kenneth P Hunt

(57) ABSTRACT

Techniques described herein relate to reducing co-channel interference between macrocells and small cells in a heterogeneous network environment. Macrocells and small cells may dynamically select from among multiple interfaces (e.g., an X2 or S1 interface) to communicate FeICIC control communications. In one implementation, the selection may be based on the round trip delay (RTD) time between pairs of nodes. Thus, the macrocells and small cells nodes may dynamically select either the X1 or S1 interface based on whichever of these interfaces has the smallest RTD to the destination radio node.

20 Claims, 7 Drawing Sheets

CO-CHANNEL INTERFERENCE MITIGATION IN WIRELESS RADIO ACCESS NETWORK

BACKGROUND

The use of wireless networks, to support mobile data communications, continues to grow rapidly. One trend in the implementation of cellular wireless networks is the increasing reliance on heterogeneous networks (HetNets). A heterogeneous cellular network may include traditional macrocell base stations overlaid with small cells (femtocells, picocells, wireless relays, etc.). The small cells may include, relative to the macrocells, smaller form factor and lower power radio nodes. By deploying HetNets with targeted small cell installations, network operators can offload users from macrocells to small cells. This technique may be particularly useful in areas with poor radio reception and/or dense mobile device populations.

The small cells may use the same spectrum (e.g., the same frequency band) as that used by the macrocells. One consequence of this is that radio co-channel interference between different small cells and/or between small cells and macrocells, can degrade the performance of networks. In particular, high radio frequency (RF) interference may potentially be experienced in HetNet overlapping and border coverage areas. This can lead to traffic capacity reduction and hence degraded mobile user experience that may be seen as lower throughput, increased packet loss, decreased jitter, and/or increased delay. The Third Generation Partnership Project (3GPP)/Long Term Evolution (LTE) standards attempt to deal with HetNet co-channel interference based on the coordination of communications between macrocells and small cells in the HetNet. The coordination of communications between macrocells and small cells is standardized, in Release 11 of the 3GPP Mobile Broadband Standard, as Further Enhanced Inter-Cell Interference Coordination (FeICIC).

DETAILED DESCRIPTION OF PREFERRED EMBODIMENTS

The following detailed description refers to the accompanying drawings. The same reference numbers in different drawings may identify the same or similar elements.

Techniques described herein relate to reducing co-channel interference between macrocells and small cells in a HetNet environment. The radio nodes corresponding to the macrocells and small cells may select an optimal interface over which FeICIC control communications may be made. In one implementation, macrocells and small cells may be connected to one another using the standardized 3GPP X2 interface. In addition, the macrocells and small cells may connect to an evolved packet core (EPC), such as to a Mobility Management Entity (MME), that is managed by the wireless network provider. For example, the 3GPP S1 interface may be used to connect radio nodes to the core network.

Consistent with aspects described herein, the macrocell and small cells may dynamically select from among multiple interfaces (e.g., an X2 or S1 interface) to communicate FeICIC control communications. In one implementation, the selection may be based on the round trip delay (RTD) time between pairs of nodes. Thus, the macrocell and small cell nodes may dynamically select either the X1 or the S1 interface based on whichever of these interfaces has the smallest RTD to the destination radio node. By selecting the interface with the smallest RTD, the performance of FeICIC may be improved.

Figure 1:
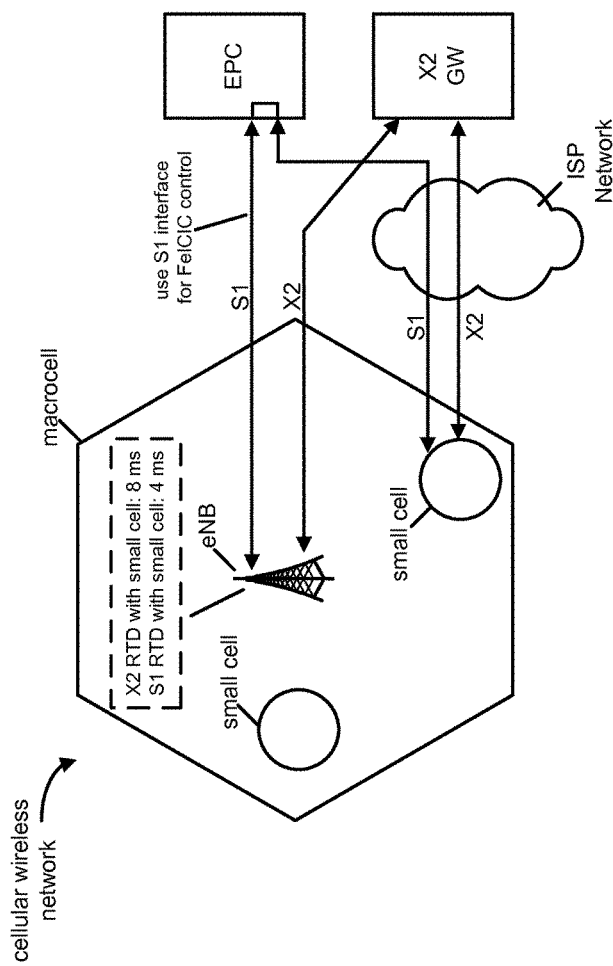
FIG. 1 is a diagram illustrating an example overview of an implementation described herein.

FIG. 1 is a diagram illustrating an example overview of an implementation described herein. As shown in FIG. 1, a cellular wireless network may include a macrocell and one or more small cells. The macrocell may be wireless coverage area that is provided by a base station, which in the context of an LTE network, may be referred to as an Evolved Node B (eNB). The small cells may be wireless coverage areas that are provided by lower power nodes and may be used, for example, to provide supplemental network coverage in areas with poor reception (e.g., indoors) or in areas that tend to have a high user density. The eNB may be connected directly to the EPC (i.e., the portion of the wireless network that provides control and backhaul services for the wireless network operator). The small cells, in some implementations, may connect to the EPC via a third party network, shown as Internet Service Provider (ISP) Network in FIG. 1. Both the eNB and the small cells may communicate with one another via the X2 interface. An X2 gateway (GW) may act to coordinate the X2 communications. Similarly, the eNB and the small cells may communicate with the EPC via the S1 interface.

The eNB and the radio nodes associated with the small cells may use the FeICIC standard to coordinate communications in the wireless network. For example, based on FeICIC, the eNB and the small cells may agree on a percentage of time that each will use the shared radio channel. Thus, as one example, out of every 100 subframes, the first 70 subframes may be used by the eNB and the remaining 30 subframes may be used by a particular small cell.

One or more devices in the EPC may act as a relay for S1 communications, so that the eNB and the small cells may communicate with one another. For example, communications that are normally transmitted over the X2 interface may be encapsulated and transmitted over the S1 interface. The EPC may relay the encapsulated communications between the eNB and the small cells. Accordingly, control communications, relating to FeICIC, may be performed either over the X2 or S1 interface.

Consistent with aspects described herein, the eNB and/or the small cells may determine communication metrics relating to communications between the eNB and the small cells and transmitted over the X2 and S1 interfaces. For example, the eNB may determine that the RTD between the eNB and the small cell is eight milliseconds over the X2 interface and four milliseconds over the S1 interface. Based on this determination, the eNB may begin to use the S1 interface for FeICIC-related control communications ("use S1 interface for FeICIC control"). At a later time, the eNB may determine that the RTD over the X2 interface has improved (e.g., to three milliseconds) and is now less than the RTD over the S1 interface. At this point, the eNB may begin to transmit FeICIC-related communications over the X2 interface.

By selectively using either the S1 or X2 interfaces to communicate FeICIC control information, the performance of FeICIC may be improved. For instance, by using the lower latency interface to communicate FeICIC control information, the coordination of the time sharing of a channel can potentially be more precise. Additionally, because two interfaces may potentially be used to communicate the FeICIC control information, reliability of the system can be improved by removing the single point of failure that would be present if using a single X2 GW. Further, by not requiring an X2 gateway, scalability and integration challenges, particularly when implementing a wireless network using equipment from multiple vendors, may be mitigated.

Figure 2:
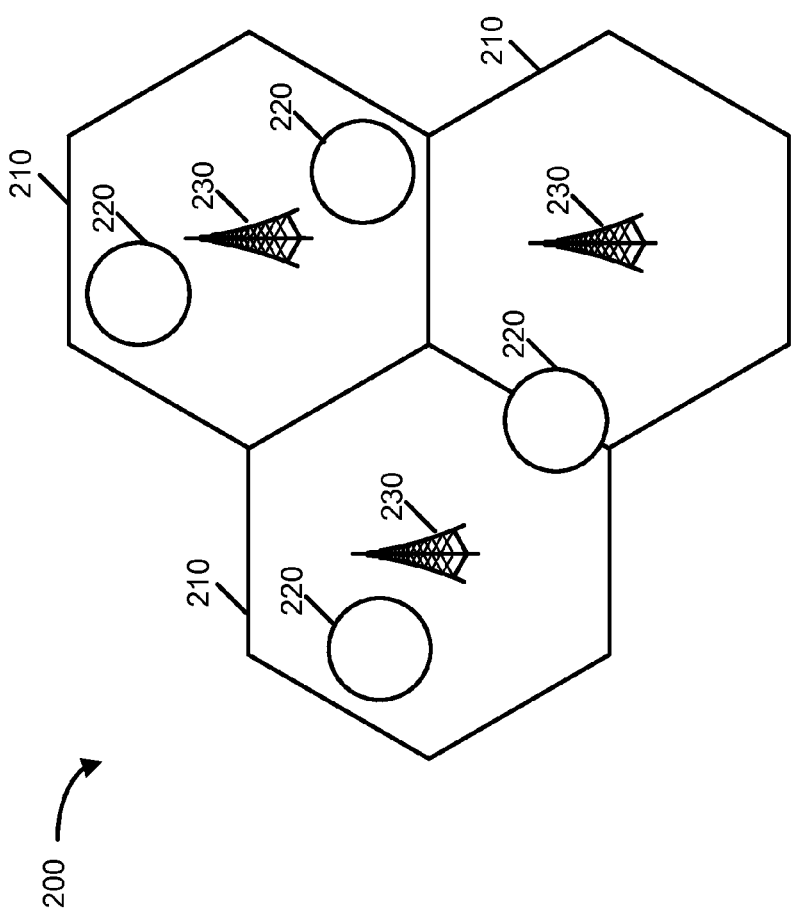
FIG. 2 is a diagram illustrating an example implementation of an LTE Radio Access Network (RAN)

FIG. 2 is a diagram illustrating an example implementation of an LTE RAN 200. As illustrated, LTE RAN 200 may include macrocells 210 and small cells 220. That is, LTE RAN 200 may be a HetNet. As previously discussed, macrocells, such as macrocells 210, may be provided by radio nodes such as eNBs 230. Each macrocell 210 may cover a relatively large area (e.g., a typical cell radius may be on the order of 500 meters to a kilometer). A macrocell 210 may provide service to all users of a particular wireless network. Small cells 220, on the other hand, may be provided by low-power radio nodes, such as femtocells (also called Home eNodeBs (HeNBs)) and picocells. Small cell 220 may include "closed" cells that provide service to a limited subset of users of the wireless network ("white-list" users) or "open" cells that provide service to all users of the particular wireless network. Small cells 220 may be deployed, by operators of the wireless network, to enhance or supplement the service areas of the wireless network. Macrocells 210 and small cells 220 may be deployed using the same radio frequency channel or same set of radio frequency channels.

As previously mentioned, the overlapping nature of the cells in in HetNets, such as LTE RAN 200, may result in undesirable radio frequency interference, which may potentially result in capacity reduction and a degraded mobile user experience in terms of throughput, packet loss, delay and jitter. FeICIC enables sharing of channel/spectrum resources among interfering neighbor cells via time coordination. For example, a pair of radio nodes associated with a macrocell and a small cell may mutually agree on a sharing scheme for a radio channel. The sharing scheme may be based on time sharing of the channel. For example, in a 70/30 sharing scheme, out of every 100 subframes, the first 70 subframes may be used by the macrocell and the remaining 30 subframes may be used by the radio node associated with the small cell. Time coordination using FeICIC can mitigate interference between macrocells 210 and small cells 220 and can improve capacity of the wireless network and the perceived user experience.

In FeICIC, control signals to coordinate time sharing are conventionally transmitted over the X2 interface. In some situations, however, the X2 interface between two cells may suffer high latency. Also, in multi-vendor deployments in which different small cells 220 are deployed using equipment from multiple vendors, integration incompatibilities can make an X2 interface unreliable or unattainable.

Figure 3:
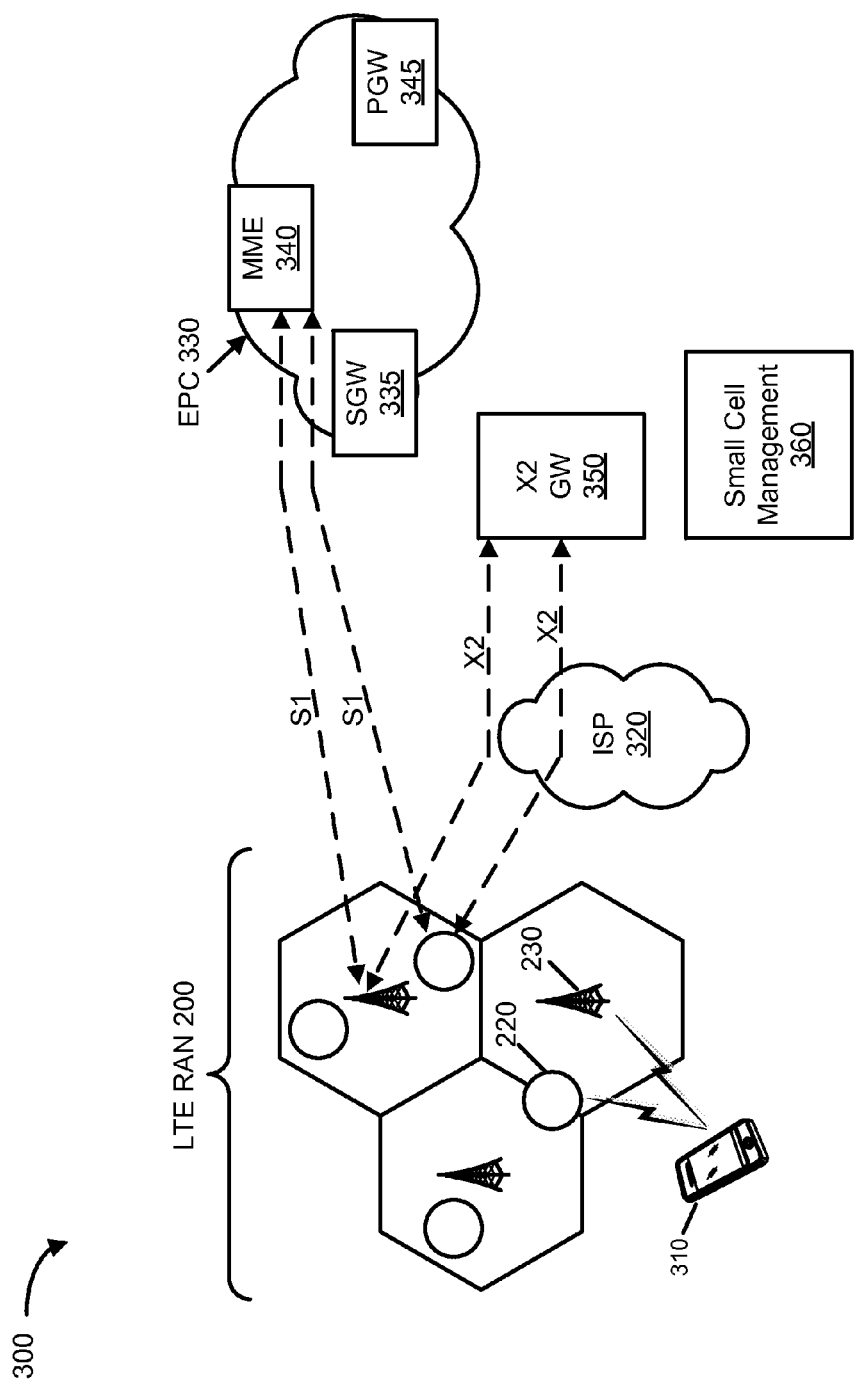
FIG. 3 is a diagram of an example telecommunications network in which systems and/or methods described herein may be implemented.

FIG. 3 is a diagram of an example telecommunications network 300 in which systems and/or methods described herein may be implemented. In general, telecommunications network 300 may include an evolved packet system (EPS) that includes an LTE RAN, an evolved packet core (EPC), and/or an Internet protocol (IP) multimedia subsystem (IMS) core that operate based on a 3GPP wireless communication standard. As shown in FIG. 3, telecommunications network 300 may include LTE RAN 200 (described previously with respect to the description of FIG. 2), User Equipment (UE) 310, ISP network 320, EPC 330, X2 GW 350, and small cell management server 360. EPC 330 may include serving gateway (SGW) 335, mobility management entity device (MME) 340, and packet data network (PDN) gateway (PGW) 345.

UE 310 may include a portable computing and communication device, such as a personal digital assistant (PDA), a smart phone, a cellular phone, a laptop computer with connectivity to a cellular wireless network, a wearable device, a tablet computer, etc. UE 310 may also include a non-portable computing device, such as a desktop computer, a consumer or business appliance, or another device that has the ability to connect to telecommunications network 300.

ISP network 320 may include a network managed and/or owned by a network service provider that is different than the network provider that provides the wireless cellular network (i.e., LTE RAN 200 and EPC 330) that serves UE 310. ISP network may include a packet data network (PDN) that may be implemented using one or more wired and/or wireless networks. ISP network 320 may connect the small cells 220 to external networks, such as EPC network 330. In some implementations, only some of small cells 220 may obtain network connectivity via ISP network 320. That is, a portion of small cells 220 may obtain network connectivity via ISP network 320 and another portion may be directly connected to EPC 330.

EPC network 330 may implement backhaul and control functionality for LTE RAN 200. EPC network 330 may be implemented as a packet-based "flat architecture." SGW 335 may be a part of EPC network 330 and may include one or more computation and communication devices that route and forward user data packets. SGW 335 may also act as a mobility anchor during inter-eNB handoffs. MME 340 may include one or more computation and communication devices that perform signaling for telecommunications network 300. MME 340 may, for example, be responsible for authenticating UE 310, maintaining location information for UE 310, and selecting a PGW 345 to service a particular UE 310. In implementations described herein, MME 340 may also act as a relay device for communications, over the S1 interface, between macrocells and small cells. For example, and as will be described in more detail below, FeICIC X2 control communications may be encapsulated as S1 data, and sent over the S1 interface, and via MME 340, between macrocells 210 and small cells 220.

PGW 345 may include one or more computation and communication devices that provide connectivity from UE 310 to external packet data networks.

X2 GW 350 may include one or more devices that act as a relay to link X2-based communications between small cells 220 and macrocells 230. When communicating over the X2 interface, radio nodes associated with small cells 220 and/or eNB 230, may transmit the communications to X2 GW 350, which may forward the communication to the destination small cell or macrocell. Although illustrated as being located externally to EPC 330, in some implementations, X2 GW 350 may be considered to be a part of EPC 330.

Small cell management server 360 may include one or more devices that provide management and/or provisioning services relating to the heterogeneous network. For example, small cell management server 360 may receive reports from small cells 220 and/or from macrocells 230, relating to sensed interference, available bandwidth, information about the currently attached UEs 310, or other information. In some implementations, small cell management server 360 may participate in FeICIC control communications. Although illustrated as being located externally to EPC 330, in some implementations, small cell management server 360 may be considered to be a part of EPC 330.

Although FIGS. 2 and 3 illustrate example components of telecommunications network 300, in other implementations, telecommunications network 300 may contain fewer components, different components, differently arranged components, or additional components than those depicted in FIGS. 2 and 3. Alternatively, or additionally, one or more components of telecommunications network 300 may perform one or more other tasks described as being performed by one or more other components of telecommunications network 300.

Figure 4:
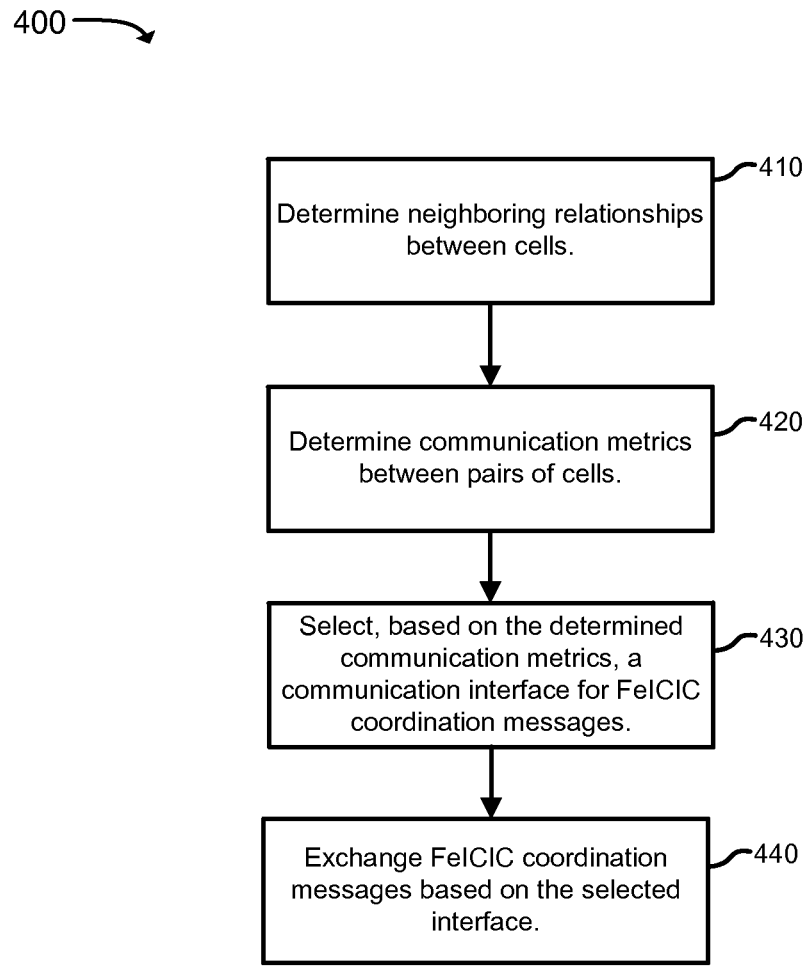
FIG. 4 is a flowchart illustrating an example process for coordinating co-channel interference mitigation in a HetNet RAN.

FIG. 4 is a flowchart illustrating an example process 400 for coordinating co-channel interference mitigation in a HetNet RAN.

Process 400 may include determining neighboring relationships between cells (block 410). The term "neighboring relationships" may refer to the physical topology and/or the radio frequency interference topology between macrocells 210 and small cells 220. The determination of the neighboring relationships may be needed in order to determine pairs of cells that should use FeICIC to mitigate co-channel interference. In one implementation, the neighboring relationships may be established as part of the initial deployment or installation of LTE RAN 200. For example, a technician, when installing or provisioning a small cell 220, may manually indicate the neighboring cells for which co-channel interference may be received. Alternatively or additionally, the neighboring relationships may be automatically determined by the radio nodes in LTE RAN 200. For example, techniques based on LTE-Advanced Self-Organization Network (SON) features, such as ANR (Automatic Neighbor Relationship) may be used to automatically determine the neighboring relationships. Additionally, in some implementations, eNBs 230 involved in the coordination may be configured to sense the presence of interfering neighbors based on user equipment Channel Quality Indicator (CQI) reports.

Process 400 may further include determining communication metrics between pairs of cells (block 420). In one implementation, the communication metrics may be determined between pairs of radio nodes (e.g., eNBs 230 and small cell radio nodes) that were identified (block 410) as having a neighboring relationship that tends to result in co-channel interference. The communication metrics may be determined by the individual radio nodes. Alternatively or additionally, a network element, such as small cell management server 360, may receive (e.g., from the radio nodes) or determine the communication metrics, and may store the communication metrics for LTE RAN 200.

As previously mentioned, in one implementation, the communication metrics may include the RTD time for control signals transmitted between pairs of radio nodes. The communication metrics may be maintained for both the S1 and X2 interfaces and may be monitored. For example, eNB 230 may, at periodic intervals, generate a test message (a network "ping" message) and transmit the message, over both the S1 and X2 interfaces, to a radio node corresponding to a particular small cell 220. The eNB may measure and keep track of the RTDs for the test message. As another example, a small cell 220 may determine the RTD time, between various nodes, by calculating the RTD time for existing messages that are transmitted between radio nodes (e.g., based on standard messages transmitted over the X2 interface).

In one implementation, each eNB 230 and/or small cell 220 radio node may independently keep track of RTD times corresponding to other radio nodes for which there is a determined co-channel interference neighboring relationship. In some implementations, the determined RTDs may be transmitted to one or more network devices, such as small cell management server 360.

Although RTD time was discussed above as an example of a communication metric, in other implementations, other metrics could be used. For example, one-way latency between a small cell 220 and a macrocell 210 may be alternatively or additionally used.

Figure 5:
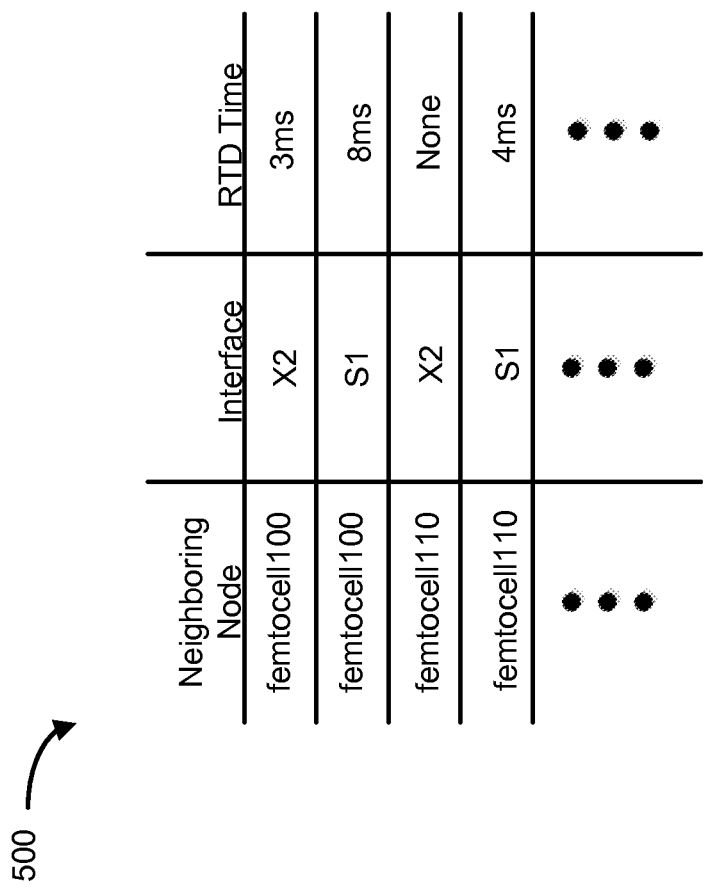
FIG. 5 is a diagram illustrating an example data structure that may be used to store the communication metrics.

FIG. 5 is a diagram illustrating an example data structure 500 that may be used to store the communication metrics determined in block 420. Data structure 500 may be maintained by, for example, the radio nodes associated with each of macrocells 210 and small cell 220.

Data structure 500 may be used to keep track of RTD times between a radio node and it neighboring radio nodes. As shown, information relating to the neighboring nodes labeled as "femtocell100" and "femtocell110" are stored in example data structure 500. For each included radio node, the determined RTD time, for the X2 and S1 interface, may be stored. As illustrated, for the neighboring node "femtocell100," the RTD time for messages transmitted over the X2 interface may be approximately 3 ms and the RTD time for messages transmitted over the S1 interface may be approximately 8 ms. Similarly, for the neighboring node "femtocell110," the RTD time for messages transmitted over the S1 interface may be approximately 4 ms. For "femtocell110," however, assume that no RTD time is available for the X2 interface. This may indicate that the X2 interface is not available for this node. For example, the X2 interface may be inoperable and/or there may be an incompatibility between the manufacturer of femtocell110 and X2 GW 350.

Data structure 500 was described as including a number of fields. In alternative possible implementations, different, fewer, or additional fields may be implemented.

Referring back to FIG. 4, process 400 may further include selecting, based on the determined communication metrics, a communication interface for the FeICIC coordination messages (block 430). In one implementation, the selected communication interface may be the interface with the smallest RTD time. For example, with respect to data structure 500, the X2 interface may be selected for FeICIC related control communications with "femtocell100." The S1 interface may be selected for FeICIC related control communications with "femtocell110." In some implementations, different interfaces may be selected on a per-radio node basis. For example, the X2 interface may be used for FeICIC related communications between eNB 230 and "femtocell100" and the S1 interface may be used for FeICIC related communications between eNB 230 and "femtocell110."

The acts associated with blocks 420 and 430 may, in general, be repeated such that the radio nodes continuously, periodically, or occasionally reevaluate the preferred communication interface for FeICIC control communications.

Process 400 may further include exchanging FeICIC coordination messages based on the selected interface (block 440). As mentioned above, based on the FeICIC standard, coordination messages may include timing information relating to how macrocells and small cells are to share timeslots for particular channels.

Figure 6:
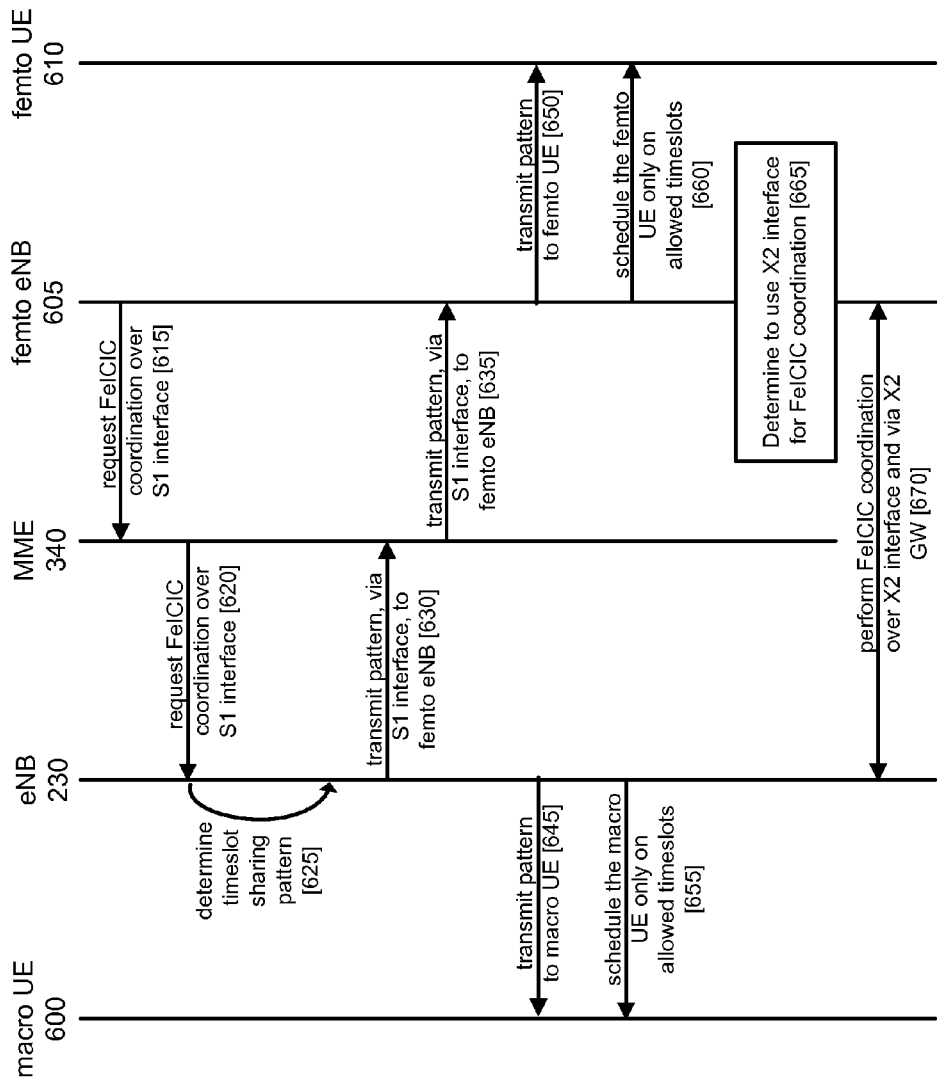
FIG. 6 is a diagram illustrating an example of signal flows relating to the coordination of co-channel interference mitigation in a HetNet RAN.

FIG. 6 is a diagram illustrating an example of signal flows relating to the coordination of co-channel interference mitigation in a HetNet RAN. In this example, assume that a first UE, labeled as macro UE 600, is a UE 310 that is attached to eNB 230 of a macrocell 210, and a second UE, labeled as femto UE 610, is a UE that is attached to a small cell radio node (femto eNB 605). Further, assume that femto eNB 605 has determined, based on the use of process 400, that the S1 interface is the preferred interface for exchanging FeICIC coordination messages.

As shown in FIG. 6, femto eNB 605 may request, via the S1 interface, FeICIC coordination with eNB 230. In particular, femto eNB 605 may send a FeICIC request message (at 615, "request FeICIC coordination over S1 interface") to MME 340, which may forward the message to eNB 230 (at 620, "request FeICIC coordination over S1 interface").

In one implementation, femto eNB 6 605 may format the message for the standard X2 interface and then encapsulate the X2-interface version of the message as an S1 communication. With this implementation, relatively little modification to eNB 230 and femto eNB 605 may be required, as the FeICIC communications can be generated as normal (i.e., as communications that are to be transmitted over the X2 interface) and then encapsulated as payload data for the S1 interface.

ENB 230, in response to the received request for FeICIC coordination, may determine a timeslot sharing pattern for the macrocell and the small cell (at 625, "determine timeslot sharing pattern"). The determined timeslot sharing pattern may be communicated, by eNB 230, to femto eNB 605, over the S1 interface. In particular, as shown, an S1 message may be transmitted to MME 340 (at 630, "transmit pattern, via S1 interface, to femto eNB"), which may forward the message to femto eNB 605 (at 635, "transmit pattern, via S1 interface, to femto eNB"). The message in 630 and 635 may be communicated as an X2 formatted message that is encapsulated using the S1 interface format.

The determined timeslot sharing pattern may be communicated, by eNB 230, and over the macrocell radio interface to macro UE 600 (at 645, "transmit pattern to macro UE"). Similarly, the timeslot sharing pattern may be communicated, by femto eNB 605, and over the small cell radio interface, to femto UE 610 (at 650, "transmit pattern to femto UE"). Subsequently, communications in the macrocell and the small cell may only be scheduled on timeslots permitted by the pattern. For instance, eNB 230 may schedule, over the macrocell radio interface, macro UE 600, based on the permitted timeslots (at 655, "schedule macro UE only on the allowed timeslots"). Similarly, femto eNB 605 may schedule, over the small cell radio interface, femto UE 610, based on the permitted timeslots (at 660, "schedule the femto UE only on the allowed timeslots").

At some point, assume that femto eNB 605 determines that the FeICIC coordination messages would be more effectively transmitted over the X2 interface. For example, the RTD time between femto eNB 605 and eNB 230 on the X2 interface may decrease to a time period that is less than the S1 interface (at 665, "determine to use X2 interface for FeICIC coordination"). Subsequent FeICIC coordination messages may then be transmitted between femto eNB 605 and eNB 230 using the X2 interface (e.g. in lieu of using the S1 interface). In particular, the FeICIC coordination messages may relayed via X2 GW 350 instead of MME 340 (at 670, "perform FeICIC coordination over X2 interface and via X2 GW").

Figure 7:
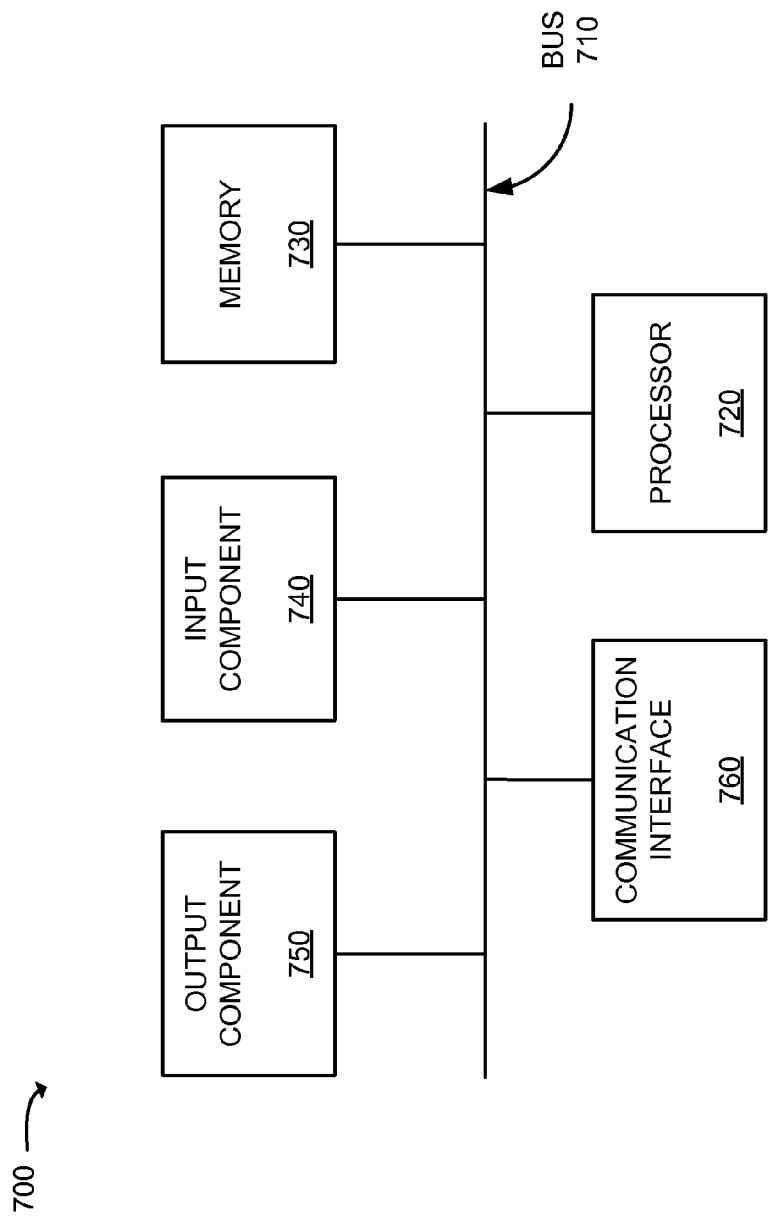
FIG. 7 is a diagram of example components of device, in accordance with some implementations described herein.

FIG. 7 is a diagram of example components of device 700. One or more of the devices described above may include one or more devices 700. Device 700 may include bus 710, processor 720, memory 730, input component 740, output component 750, and communication interface 760. In another implementation, device 700 may include additional, fewer, different, or differently arranged components.

Bus 710 may include one or more communication paths that permit communication among the components of device 700. Processor 720 may include a processor, microprocessor, or processing logic that may interpret and execute instructions. Memory 730 may include any type of dynamic storage device that may store information and instructions for execution by processor 720, and/or any type of non-volatile storage device that may store information for use by processor 720.

Input component 740 may include a mechanism that permits an operator to input information to device 700, such as a keyboard, a keypad, a button, a switch, etc. Output component 750 may include a mechanism that outputs information to the operator, such as a display, a speaker, one or more light emitting diodes (LEDs), etc.

Communication interface 760 may include any transceiver-like mechanism that enables device 700 to communicate with other devices and/or systems. For example, communication interface 760 may include an Ethernet interface, an optical interface, a coaxial interface, or the like. Communication interface 760 may include a wireless communication device, such as an infrared (IR) receiver, a Bluetooth® radio, or the like. The wireless communication device may be coupled to an external device, such as a remote control, a wireless keyboard, a mobile telephone, etc. In some embodiments, device 700 may include more than one communication interface 760. For instance, device 700 may include an optical interface and an Ethernet interface.

Device 700 may perform certain operations relating to one or more processes described above. Device 700 may perform these operations in response to processor 720 executing software instructions stored in a computer-readable medium, such as memory 730. A computer-readable medium may be defined as a non-transitory memory device. A memory device may include space within a single physical memory device or spread across multiple physical memory devices. The software instructions may be read into memory 730 from another computer-readable medium or from another device. The software instructions stored in memory 730 may cause processor 720 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described with regard to FIGS. 4 and 6, the order of the blocks and/or signals may be modified in other implementations. Further, non-dependent blocks and/or signals may be performed in parallel.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A radio node in a wireless network, the radio node comprising:
   a non-transitory computer-readable medium containing instructions, and
   processing logic to execute the instructions to:
      determine a first communication metric relating to a Long Term Evolution (LTE) S1 interface between the radio node and another radio node in the wireless network;
      determine a second communication metric relating to a LTE X2 interface between the radio node and the other radio node in the wireless network;
      select, based on the first and the second communication metrics, one of the S1 interface or the X2 interface as an interface over which Further Enhanced Inter-Cell Interference Coordination (FeICIC) messages are to be transmitted; and
      transmit, over the selected interface, the FeICIC messages,
      wherein the determination of the first and second communication metrics and the selection of the S1 interface or the X2 interface, for transmission of the FeICIC messages, is periodically performed to reevaluate the selection of which interface to use to transmit the FeICIC messages.

2. The radio node of claim 1, wherein the radio node includes a radio node for a small cell in a heterogeneous network (HetNet) and the other radio node includes a macrocell Evolved Node B (eNB).

3. The radio node of claim 2, wherein the FeICIC messages include a request to receive a FeICIC timeslot sharing schedule.

4. The radio node of claim 1,
   wherein the first communication metric includes a Round Trip Delay (RTD) time between the radio node and the other radio node for communications sent using the S1 interface, and
   wherein the second communication metric includes a RTD time between the radio node and the other radio node for communications sent using the X2 interface.

5. The radio node of claim 1, wherein the FeICIC messages relate to sharing of timeslots, associated with an interfering communication channel, used by the radio node and the other radio node.

6. The radio node of claim 1, wherein the processing logic is further to:
   automatically determine neighboring relations between macrocells and small cells in the wireless network, wherein the communication metrics are determined based on the neighboring relations.

7. The radio node of claim 1, wherein the processing logic, when transmitting the FeICIC messages over the S1 interface, is further to:
   format the FeICIC coordination messages as X2 messages; and
   encapsulate the formatted X2 messages as S1 payload data, wherein transmitting the FeICIC messages includes transmitting the encapsulated version of the FeICIC coordination messages.

8. The radio node of claim 7, wherein transmitting the FeICIC messages includes transmitting the FeICIC messages to a Mobility Management Entity (MME) associated with an Evolved Packet Core (EPC) of the wireless network.

9. A method, implemented by a radio node in a wireless network, the method including:
determining a first communication metric relating to a Long Term Evolution (LTE) S1 interface between the radio node and another radio node in the wireless network;
determining a second communication metric relating to a LTE X2 interface between the radio node and the other radio node in the wireless network;
selecting, based on the first and the second communication metrics, either the S1 interface or the X2 interface as an interface over which Further Enhanced Inter-Cell Interference Coordination (FeICIC) messages are to be transmitted; and
transmitting, over the selected interface, the FeICIC messages,
wherein the determination of the first and second communication metrics and the selection of the S1 interface or the X2 interface, for transmission of the FeICIC messages, is periodically performed to reevaluate the selection of which interface to use to transmit the FeICIC messages.

10. The method of claim 9, wherein the radio node includes a radio node for a small cell in a heterogeneous network (HetNet) and the other radio node includes a macrocell Evolved Node B (eNB).

11. The method of claim 10, wherein the FeICIC messages include a request to receive a FeICIC timeslot sharing schedule.

12. The method of claim 9,
wherein the first communication metric includes a round trip delay (RTD) time between the radio node and the other radio node for communications sent using the S1 interface, and
wherein the second communication metric includes a RTD time between the radio node and the other radio node for communications sent using the X2 interface.

13. The method of claim 9, wherein the FeICIC messages relate to sharing of timeslots, associated with an interfering communication channel, used by the radio node and the other radio node.

14. The method of claim 9, further including:
automatically determining neighboring relations between macrocells and small cells in the wireless network.

15. The method of claim 9, wherein transmitting the FeICIC messages over the S1 interface includes:
formatting the FeICIC messages as X2 messages; and
encapsulating the formatted X2 messages as S1 payload data, wherein transmitting the FeICIC messages includes transmitting the encapsulated version of the FeICIC coordination messages.

16. The method of claim 15, wherein transmitting the FeICIC messages includes:
transmitting the FeICIC messages to a Mobility Management Entity (MME) associated with an Evolved Packet Core (EPC) of the wireless network.

17. A system comprising:
a Mobility Management Entity (MME) associated with an Evolved Packet Core (EPC) of a wireless network;
an X2 gateway;
a macrocell Evolved Node B (eNB); and
a small cell radio node to:
determine a first communication metric between the small cell radio node and the eNB for traffic that is transmitted, using the X2 gateway as a relay, between the small cell radio node and the eNB;
determine a second communication metric between the small cell radio node and the eNB for traffic that is transmitted, using the MME as a relay, between the small cell radio node and the eNB;
select, based on the first and the second communication metrics, to use either the X2 gateway or the MME as a relay for subsequent Further Enhanced Inter-Cell Interference Coordination (FeICIC) messages; and
transmit, using the selected relay, the FeICIC messages,
wherein the determination of the first and second communication metrics and the selection of the X2 gateway or the MME as a relay, for transmission of the FeICIC messages, is periodically performed to reevaluate the relay selection.

18. The system of claim 17,
wherein the first communication metric includes a round trip delay (RTD) time between the small cell radio node and the eNB for communications sent using the S1 interface, and
wherein the second communication metric includes a RTD time between the small cell radio node and the eNB for communications sent using the X2 interface.

19. The system of claim 17, wherein the FeICIC messages relate to sharing of timeslots, associated with an interfering communication channel, used by the small cell radio node and the eNB.

20. The system of claim 17, wherein the processing logic, when transmitting the FeICIC messages over the S1 interface, is further to:
format the FeICIC coordination messages as X2 messages; and
encapsulate the formatted X2 messages as S1 payload data, wherein transmitting the FeICIC messages includes transmitting the encapsulated version of the FeICIC messages.

* * * * *